(12) United States Patent
Anton, Jr. et al.

(10) Patent No.: US 7,185,360 B1
(45) Date of Patent: Feb. 27, 2007

(54) SYSTEM FOR DISTRIBUTED NETWORK AUTHENTICATION AND ACCESS CONTROL

(75) Inventors: Francis M. Anton, Jr., San Jose, CA (US); Clark Dong, San Jose, CA (US); Jong C. Kim, San Jose, CA (US); Ranganatha Marathe, Santa Clara, CA (US)

(73) Assignee: Hereuare Communications, Inc., Santa Clara, CA (US)

( * ) Notice: Subject to any disclaimer, the term of this patent is extended or adjusted under 35 U.S.C. 154(b) by 502 days.

(21) Appl. No.: 09/629,408

(22) Filed: Aug. 1, 2000

(51) Int. Cl.
*G06F 15/173* (2006.01)

(52) U.S. Cl. .................... 726/3; 713/169; 713/182; 726/2; 726/22; 709/202; 709/219; 709/225; 709/227; 709/229; 709/244; 370/252

(58) Field of Classification Search ............... 713/169, 713/182, 200–202; 709/202, 219, 225, 227, 709/229, 244; 370/252, 402, 466; 382/100; 434/350; 726/2–3, 22
See application file for complete search history.

(56) References Cited

U.S. PATENT DOCUMENTS

| | | | | |
|---|---|---|---|---|
| 5,539,824 A | | 7/1996 | Bjorklund et al. ............ 380/21 |
| 5,771,462 A | | 6/1998 | Olsen ........................ 455/524 |
| 5,898,780 A | | 4/1999 | Liu et al. ..................... 380/25 |
| 6,092,196 A | * | 7/2000 | Reiche ........................ 713/200 |
| 6,161,185 A | * | 12/2000 | Guthrie et al. .............. 713/201 |
| 6,212,561 B1 | * | 4/2001 | Sitaraman et al. .......... 709/225 |
| 6,282,575 B1 | * | 8/2001 | Lin et al. .................... 709/244 |
| 6,285,683 B1 | * | 9/2001 | Lin ............................. 370/466 |
| 6,377,781 B1 | * | 4/2002 | Mishkin ..................... 434/350 |
| 6,460,084 B1 | * | 10/2002 | Van Horne et al. ......... 709/227 |
| 6,466,981 B1 | * | 10/2002 | Levy ........................... 709/227 |
| 6,510,464 B1 | * | 1/2003 | Grantges et al. ............ 709/225 |
| 6,636,894 B1 | * | 10/2003 | Short et al. .................. 709/225 |

* cited by examiner

*Primary Examiner*—Taghi T. Arani
(74) *Attorney, Agent, or Firm*—Intellectual Property Law Group LLP; Otto O. Lee

(57) ABSTRACT

A user gains access to a private network by connecting to a network, either through a hardwired or wireless connection, and then initiates an Internet access request targeting any website. If the user is not already authorized for Internet access, then the user is sent to a first predetermined website that points the user to an authentication server accessible via the Internet. The authentication server sends the user an HTTP form pages requesting authentication information. When the user responds, a network monitoring device within the private network alters the form page to include the user's hardware address and an encoded ID based on the network's location. The authentication server forwards this data to a gate keeper server, which authenticates the new user and transmits an unblock message along with another encoded ID based on the network's location and the user's hardware address.

32 Claims, 8 Drawing Sheets

SYSTEM FOR DISTRIBUTED NETWORK AUTHENTICATION AND ACCESS CONTROL

BACKGROUND OF THE INVENTION

1. Field of the Invention

The invention relates to a computer method and system for performing user authentication and access control of data traffic at wireline and wireless entry points to the Internet.

2. Background of the Related Art

The popularity of the Internet has made a vast amount of information readily available to anyone with an Internet connection. Internet-enabled electronic mail has become an essential form of business communication. Currently, connections to the Internet are predominantly made with landline access links such as dial-up modems, digital subscriber lines, and cable modems.

These types of connections, although pervasive, offer limited mobility to a user and make the sharing of an Internet connection difficult. For example, many libraries offer Internet access at dedicated computer terminals and some universities provide network access jacks at multiple buildings on their campuses for convenient access by students using laptop computers. Both of these approaches offer a means for accessing the Internet at locations other than one's own landline access link, but both require that one remain stationary at the publicly-provided access point and both require a substantial infrastructure investment on the part of the institution providing the network connection. Since it is not generally possible to have multiple users sharing the same network access jack or dedicated terminal, the institution must provide a separate access point for each patron it wishes to service. Additionally, those institutions offering access jacks to their network, such as universities, typically require that the user have a registered network account before being given access to the network, which further limits the network's accessibility to the public.

Similarly, when a vendor visits a customer site on whose computer network the vendor does not have an account, the vendor will find it very difficult to gain access to the network, and hence to the Internet, email accounts, and other vital data. Should the vendor be fortunate enough to gain access to a network jack, the vendor will still be at the mercy of the customer site's network administrator. For security reasons, it is customary for companies to set up their computer networks to deny access to anyone not already present in their access list of registered users.

Thus, mobile access to the Internet is limited by two factors. The first is the physical requirement for a user to maintain a line connection to sparsely located network access jacks. The second is the difficulty in gaining access to a network on which one does not have a registered account. The first of these factors has begun to be overcome by the introduction of wireless data networks, which do not require that a user maintain an access line plugged into a network access jack and thus do not require that the user remain stationary. Additionally, because the network connections are made wirelessly, it is relatively easy for multiple users to connect and disconnect from a network using the same access point. Overcoming the second factor is not so straightforward, and is addressed more fully below.

An example of a currently widely available wireless data network is the low speed personal communication service (PCS) network. The primary access devices of this type of network are cellular telephones with built-in Wireless Application Protocol (WAP) features. These wireless networks operate in a licensed frequency band, are centrally planned, and are built by large telecommunication carriers. Typically, each cell has a large radius of about 2–10 miles and operates at a slow speed of about 19 Kbps. In any given geographical region there are only a handful of telecommunication carriers servicing the area, and each network is proprietary and closed to competing networks. Thus, to some degree one is not free to roam from one network to another. Additionally, their slow speed makes full access to the Internet impractical and such network devices are typically restricted to abridged textual displays.

An emerging new class of wireless data networks offer higher speeds of about 1–11 Mbps. These networks operate in an unlicensed frequency band and are based on emerging wireless communication protocol standards such as IEEE 802.11, Bluetooth and homeRF. A common characteristic of these types of networks is a small cell radius of about 200 feet. The cells are radio or infrared base stations that function as access points to a network. Several of these access points may be distributed in close proximity to each other to expand the overall range of this type of wireless network. An introduction to such networks can be found in U.S. Pat. Nos. 5,771,462 and 5,539,824.

Various network configurations may be formed using these types of wireless network devices. FIG. 1 shows multiple computers 11 to 17 equipped with wireless network radio devices characterized by respective antennas 19–25. When computers 11–17 are within close proximity to each other, they can form a type of ad hoc network and communicate among themselves. Absent from this type of ad hoc network, however, is a base station cell that can connect their ad hoc network to a wireline network having landline access to the Internet. Therefore, this type of ad hoc network does not have access to the Internet.

With reference to FIG. 2, in order to access the Internet, one needs to gain access to a network having a router 37 which in turn connects the network to the Internet 35. These types of networks are typically characterized by a server 31 which controls access to various services on the network, including Internet services. Workstations 33 connect to the server 31 by means of various types of hardware cabling media 53. The network may provide wireless access points 41 and 43 to respectively couple computers 47 and 49, which are equipped with wireless communication devices illustrated as antennas, to the hardwired network controlled by server 31. The access points 41 and 43 establish wireless connections with computers 47 and 49 by means of various communication systems such as radio and infrared waves, and have a hardwired connection to server 31 along cable 53. The function of access points 41 and 43 is to relay communication between server 31 and wireless network computers 47 and 49 respectively, but server 31 still controls what services are provided to computers 47 and 49. Thus, server 31 may deny Internet services to computers 47 and 49. Indeed, server 31 may refuse computers 47 and 49 entry to the network if they do not already have network accounts registered with server 31.

As was stated above, wireless networks have a short range, and so a second access point 45 may be used to function as a repeater between a more distant wireless network computer 51 and access point 43. This is an example of using multiple base station access points 43 and 45 to extend the range of a wireless network.

With reference to FIG. 3, many network layout configurations are known, and server 53 need not be located between a router 55 and the other network nodes 61 to 65. In the network layout of FIG. 3, access point 67 has direct access to router 55, which in turn has access to the Internet 59, but this does not mean that server 53 loses its control over the network. Regardless of the layout, server 53 may still be in charge of authenticating new users and assigning resources. Again, access point 67 is illustrated as a wireless access point due to its convenience in permitting multiple users 61 to 65 easy access to the network, but other hardwired access point connections are likewise typical.

In spite of their convenience, such wireless networks have been prohibitive in the past due to their relatively high costs. Until recently, the components required to implement a wireless network had been costly, but recent developments in technology have begun lowering the price of both the cell base stations and radio devices needed to implement a wireless network. Such wireless networks are now becoming more prevalent in the industry, and Applicants envision a time when many small businesses may operate their own autonomous wireless networks. The size of these autonomous wireless networks could range from a city block, to a small building, to a coffee shop. It would then be possible for a mobile user to always have access to a wireless network by means of a mobile computing device equipped with the proper radio communication devices. Thus, this type of wireless network would overcome the first factor limiting the free and mobile access to the Internet discussed above.

Nonetheless, one is still faced with the second factor mentioned above which restricts mobile access to the Internet. Since most autonomous wireless networks are independent, a mobile user would typically not be given access to a target network unless an access account had been setup ahead of time for the mobile user on the target network. Even if a user had access accounts at multiple wireless networks, the user would have to stop his activities and re-authenticate on a different wireless network every time he moved from one autonomous network to another.

Some prior art can be found in the areas describing methods of accessing foreign networks and methods of implementing multiple network transfers. U.S. Pat. No. 5,878,127, for example, shows a telephone system that facilitates remote access to a private network from non-network locations or stations. The system authorizes remote access to the private network based on a calling party number of the non-network station and/or an authentication code entered by the remote calling party. U.S. Pat. No. 6,016,318 describes various method of providing access to a private LAN and to the Internet via a "public mobile data network" including a location register, which serves as a database for storing location information of mobile data terminals and subscriber information. Along a similar note, U.S. Pat. No. 5,978,373 shows a method by which a remote user can gain secure access to a private WAN. A central authentication office acts as a proxy to authorize a remote user and establish a secure connection to the private network. The central office sends the remote user a service registration template HTML file to be filled by the remote user. Once the remote user has been authenticated, a connection is made with the private network. Similarly, U.S. Pat. No. 5,918,019 shows a system by which a remote user can establish a simulated direct dial-up connection to a private network via the Internet.

U.S. Pat. No. 6,000,033 describes a system wherein a user has accounts in multiple databases with different passwords in each of the databases. To access all of the databases, the user logs on to a master password database which then submits the appropriate password to whichever database the user wishes to access. U.S. Pat. No. 5,872,915 shows a method of permitting secure access to software on a web server via the Internet. A user enters data via a web browser, which is communicated to the web server application. The web server application then authenticates the web browser, and passes appropriate input data to an application gateway, including data to uniquely identify the web browser. The application gateway then uses authentication data received from the browser to determine whether the user of the browser is authorized to access the software application. U.S. Pat. No. 5,805,719 describes another method of authenticating a user wherein the system forgoes the use of ID tokens in favor of authorizing transactions by using the correlative comparison of a unique biometrics sample, such a finger print or voice recording, gathered directly from the person of an unknown user, with an authenticated biometrics sample of the same type obtained and stored previously.

SUMMARY OF THE INVENTION

The above described methods of authenticating a user and increasing communication between foreign networks do not address the problem of permitting network access to a mobile user who does not have a registered account with a target network. Similarly, they do not discuss the infrastructure required to implement such a system.

It is an object of the present invention to provide a system and method of permitting mobile users to gain Internet access via foreign data networks.

It is another object of the present invention to provide a system of facilitating wireless access to the Internet even without the use of an intermediate private network.

The above objects are met in a method of permitting distributed access control of computing devices across a plurality of small-radius data networks. The present invention, however, is not limited to small-radius data networks, and can be applied traditional hardwired, large-radius networks. A user wanting to gain access to a private network first makes a physical connection to the target network. The physical connection may be through a wireless base station, or may be through a wired hub, switch, or firewall. Once connected, the potential new user may then try to gain access to the target network's resources, such as Internet services.

Typically, a private network would respond to a new user attempting to gain access to the network by first attempting to verify the new user's identity and network privileges. If the new user is not among the private network's lists of authorized users, then the private network would have the choice of refusing the new user entry to the network or establishing a temporary session with minimal privileges for the new user under a guest account. If the new user were given a guest account, however, the private network would not have an accurate record of the new user's identity. Thus, most private network choose to refuse entry to any unregistered users. This type of network response is especially problematic in an envisioned distributed network consisting of multiple small private networks responsive to mobile individuals. The present invention seeks to alleviate this predicament by establishing a system by which new users in such "guest" accounts would be accurately identified.

This identification is useful not only for maintaining an accurate log of all users on a network, but also for billing purposes. For example, in a distributed network consisting of multiple small private networks, it may desirable to bill "guest" users for access time on a private network. In the present invention, this is accomplished by having a centralized authentication web server to which both a mobile user and a target private network subscribe. The mobile user creates an account with the authentication web server, including an identification means such as a password. The private network accepts the authentication results from the authentication web server and creates the appropriate limited network access for the new user.

In operation, a client device (new user) physically connects to the target network via an access control device and initiates an Internet access request. If the client device is not among the target network's list of authorized users, the access control re-directs the client device to the authentication web server via the Internet. The authentication web server sends the client device an HTML logon page through which the client device supplies the proper authentication information to the system. The authentication device parses the information sent to it by the client device and authenticates the client device. If the client device is properly identified, then the authentication web server sends an "unblock" message to the access control device which is used exclusively for the specified client device. All further traffic from the client device flows through the access control device until an access expiration event happens, such as a timer expiration, an explicit "disable client device" message, or a client device disconnected message.

It is thus very important that the authentication web server be able to accurately identify both the client device and the target network. Due to the pervasive use of network address translation services in the industry, it cannot be assured that the IP addressing information received from the client device is accurate, nor would it be prudent to rely on identification information from the web browser, such as cookies, to establish the identity of the client device; otherwise the system would be susceptible to malicious use by software hackers. Therefore, the present invention establishes the identity of users by using embedded IDs generated from the client device's and access point's hardware host addresses into reserved string fields of an HTML file.

Additionally, since the present invention is interested primarily in providing Internet access to mobile users, the present invention proposes the use of enhanced remote access points having built-in router capabilities to directly connect a potential client user to the authentication web server and the Internet without the need of a private party's autonomous network. The authentication web server would maintain a record of the individual access points used and the names of the client users. Thus, the owners of the enhanced access points would still maintain an accurate record of all users for billing purposes. Alternatively, the client users could be billed or charged directly by the authentication web server and a percentage of the billings sent to the owner of the enhanced access point used by the client user.

BRIEF DESCRIPTION OF THE DRAWINGS

These and other objects, features and advantages of the present invention are better understood by reading the following detailed description of the preferred embodiment, taken in conjunction with the accompanying drawings, in which.

DETAILED DESCRIPTION OF PRESENTLY PREFERRED EXEMPLARY EMBODIMENTS

In order to facilitate the use of the present invention, the best mode of a presently preferred exemplary embodiment makes use of existing hardware and software tools with minimal modification to both. As it is known in the art, network communication processes are divided into multiple standardized stages, or layers, and each layer is assigned a specific task necessary for network communication. A widely used network communication standard is the Open System Interconnection (OSI) standard developed by the International Standards Organization (ISO). The OSI communication model divides network communication into seven layers. Each layer has a predefined, standardized mechanism for communicating with the layer immediately above it and immediately below it. In this manner, any layer may be modified or optimized without requiring modification of any other layer as long as the same standardized mechanism is used to communicate with adjacent layers.

The first layer is the physical layer and it describes the hardware medium for transmitting and receiving a logic 1 and a logic 0. The second layer is the data link layer and it translates messages into correct format for the physical layer to transmit, and translates messages received by the physical layer for upper layers to understand. Basically the data link layer formats messages into data frames that encapsulate the messages and adds customized information, including a CRC code, destination address information, and source address information. The third layer is the network layer and its main function is to direct data from a source network to a destination network. This third layer is sometimes called the Internet layer since its job is basically to route messages and provide a standard network interface for upper layers. The present invention resides in this third layer, and thereby can be implemented with software modifications without requiring any additional hardware modifications. Since much of the existing hardware, such as routers and hubs, have updateable firmware, the present invention may be easily assimilated into current networks.

Various types of network protocols may be associated with the third layer of the OSI model, but the present invention preferably makes use of the Internet protocol, IP, which is the protocol used by networks to communicate with the Internet. It may therefore be advantageous to briefly describe the aspects further aspects of the IP addressing protocol relevant to the best mode of this preferred embodiment of the present invention before proceeding further in this discussion.

Figure 4:
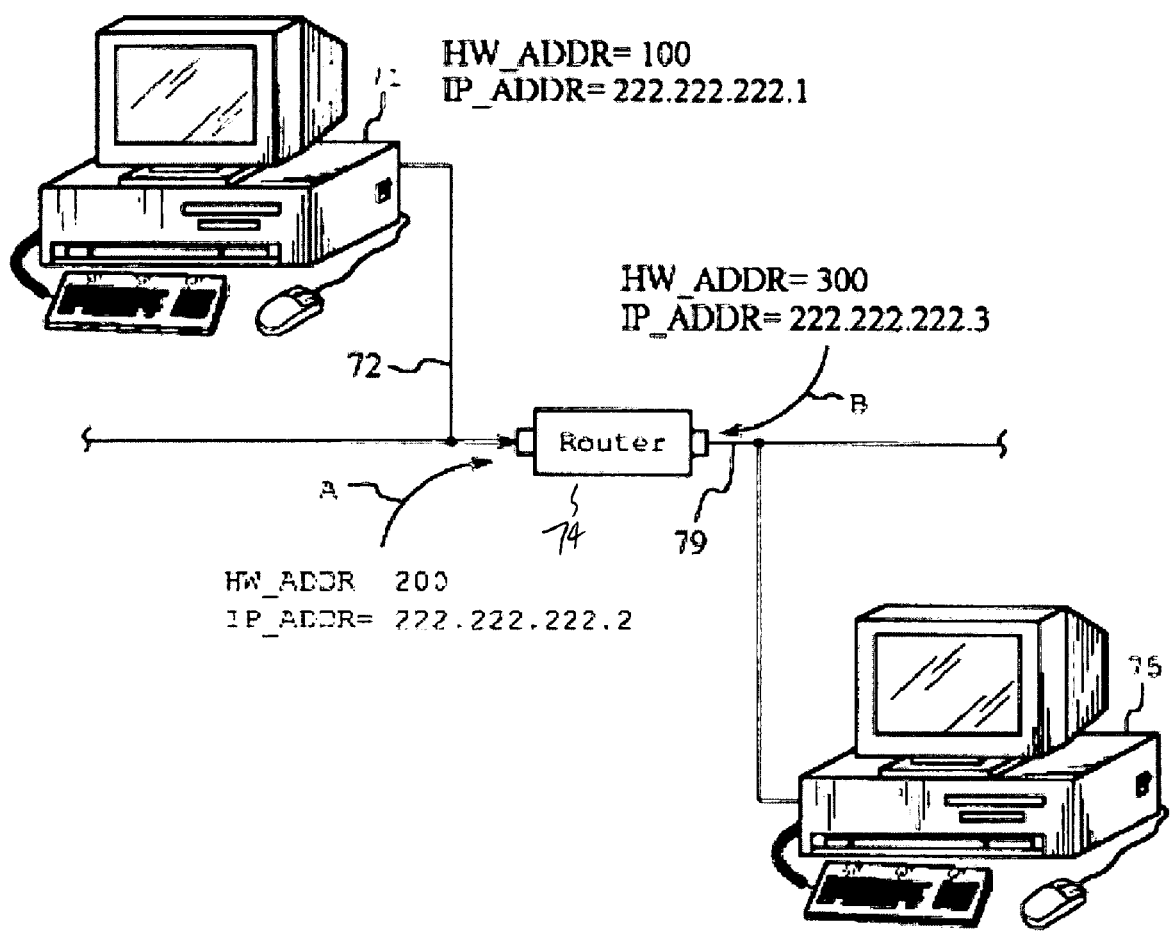
FIG. 4 is a prior art depiction of network communication using IP protocols.

With reference to FIG. 4, computer 71 is part of a first network 72 wishing to communicate with computer 75, which is part of a second network 79. The two networks 72 and 79 are coupled by router 74, which relays messages between the networks 72 and 79. Every node in a network has a unique hardware address, including side A of router 74, which communicates with computer 71, and side B of router 74, which communicates with computer 75. When nodes within the same network target each other for communication, the sent messages are encapsulated with header information including the hardware and IP address of the source node and the hardware and IP address of the destination, or target, node. All nodes within the same network may pick up the message, but the message is ignored if the destination hardware address does not match their own. If the hardware address does match a particular node, then that node checks the IP address of the message to verify that they are indeed the intended receiver of the message. For example, if computer 71 wished to send a message to router 74, then the message header would include a source hardware address of 100, source IP address of 222.222.222.1, a destination hardware address of 200 and destination IP address of 222.222.222.2. If router 74 wanted to respond to the message then its response would include a similar header with the source and destination addresses interchanged.

When messages must pass several networks to reach their destination node, the header information changes every time the message traverses a router. Nonetheless, the IP address of the destination node is maintained constant across the networks. As an example, assuming that computer 71 wishes to send a message to computer 75, the header of the information must relay the message through router 74. Therefore, the message leaving computer 71 will include a source hardware address of 100 and an IP address of 222.222.222.1, as well as the IP address of computer 75. However, since computer 75 is not within the same network as computer 71, the message will include the hardware address 200 of the router 74. The router 74 will pick up the message since the message has its hardware address, but upon inspection of the destination IP address will determine that the final destination is that of computer 75. Therefore, the router will forward the message to computer 75 with a new header. The new header will identify computer 71 as the originator of the message by maintaining its source IP address of 222.222.222.1, but will identify router 74 as the sender of the forwarded message by listing the source hardware address 300 of side B of router 74. Since side B of router 74 faces the same network 79 as computer 75, the forwarded message will include the correct destination hardware and IP address of computer 75. When responding, computer 75 will know that the original source of the message was computer 71 because it IP address was preserved in spite having received the message from the router 74. This would be true no matter the number of routers the message had to traverse before reaching computer 75. In this case, it can be seen that the source IP address in the header of a message can uniquely identify the originator of a message, whereas the source hardware address changes every time the message passes through a router and is thus not a reliable source for identifying the originator of the message. It would seem therefore that the source IP address in the header of a message would be a prime candidate for identifying a specific node across multiple networks, as is required by the present invention. However, this is not the case if a message crosses a network making use of Network Address Translation (NAT) services to manage its access network nodes.

In order for a node to access the Internet, the node must have a unique IP address. However, the number of unique IP address is limited and many networks make use of NAT services for permitting many network nodes, or network computers, to access the Internet using the same IP address.

Figure 5:
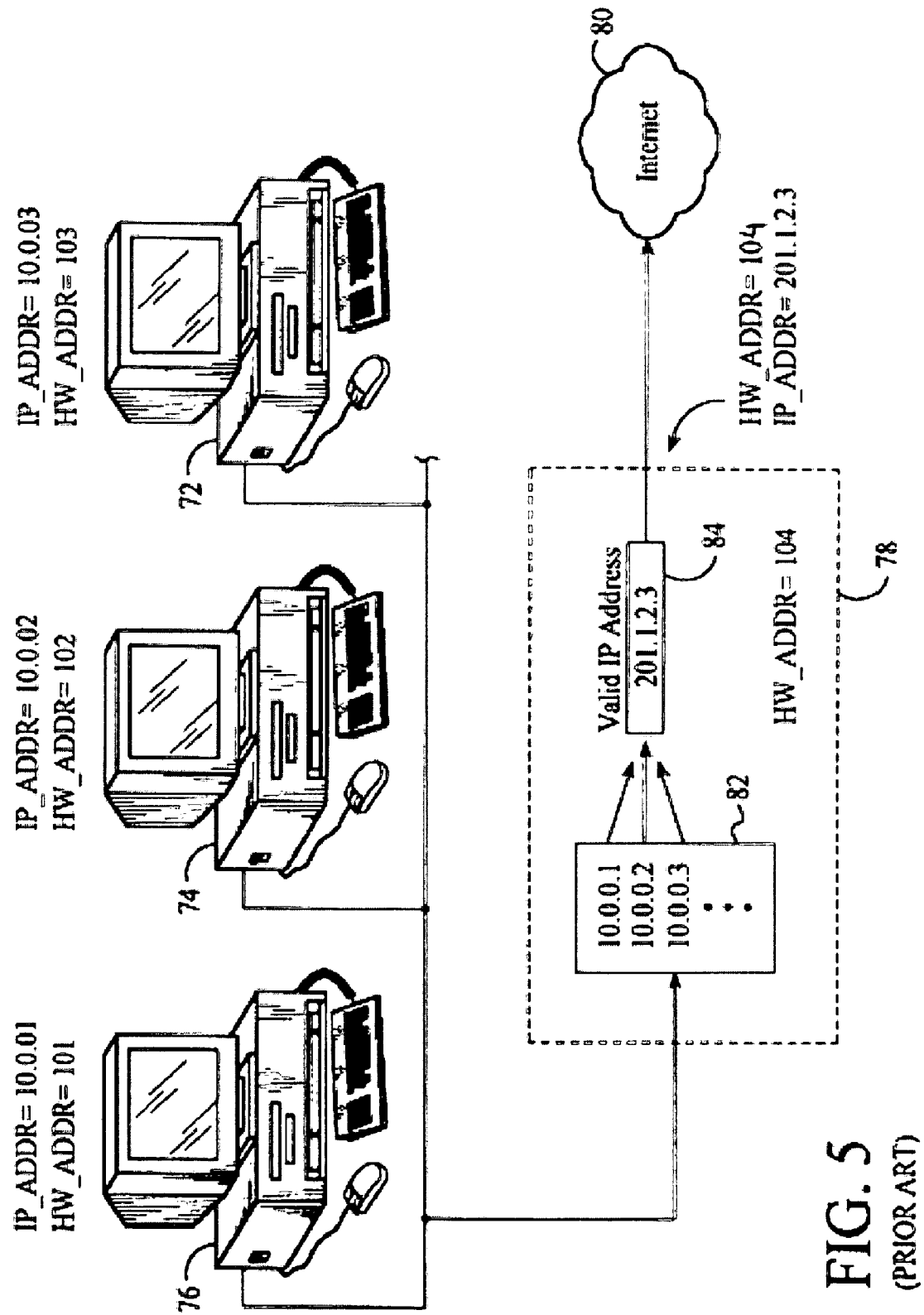
FIG. 5 is a prior art depiction of the use of network address translation.

A simple example of network address translation is shown in FIG. 5. here, computers 72 to 76 are part of a network that shares a single valid IP address, 201.1.2.3, by means of a network address translation manager 78. Each of computers 72 to 76 is given an arbitrary IP address that is unique within the network, but is not necessarily a valid Internet IP address. When any of computers 72 to 76 wants to access the Internet 80, they must first through NAT manager 78, which relays the message to the Internet with the correct IP address 84 and its own hardware address 104. Additionally, NAT 78 assigns a unique access port number to each incoming message from computers 72–76, and maintains a table associating the hardware and IP address of the originating source computer 74–76 with the assigned port number. This assigned port number is part of the identification data included in the header encapsulating a message, and is therefore sent along with the message to the Internet 80. When a message is received from the Internet 80, the header information of the received message will list the IP and hardware address of NAT 78 as its destination data, but will also have the port number NAT 78 had assigned to the originally relayed message. NAT 78 uses this port number to identify which of computers 72–76 originated the message and relays the response from the Internet to the computers 72–76 accordingly.

Thus in this case, a target web page within the Internet 80 will not be able to identify the originator of a message since all messages coming from the network behind NAT 78 will have the same source IP and hardware address. Therefore, this preferred embodiment of the present invention chooses not to rely on the source IP address in the header of a message when trying to identify the network node that originated a message.

A major object of the present invention is to be able to uniquely identify a mobile user no matter what type of network the user connects to in order to gain access to the Internet. Therefore, this preferred embodiment of the present invention deviates from the prior art when identifying the source of a mobile user.

Figure 1:
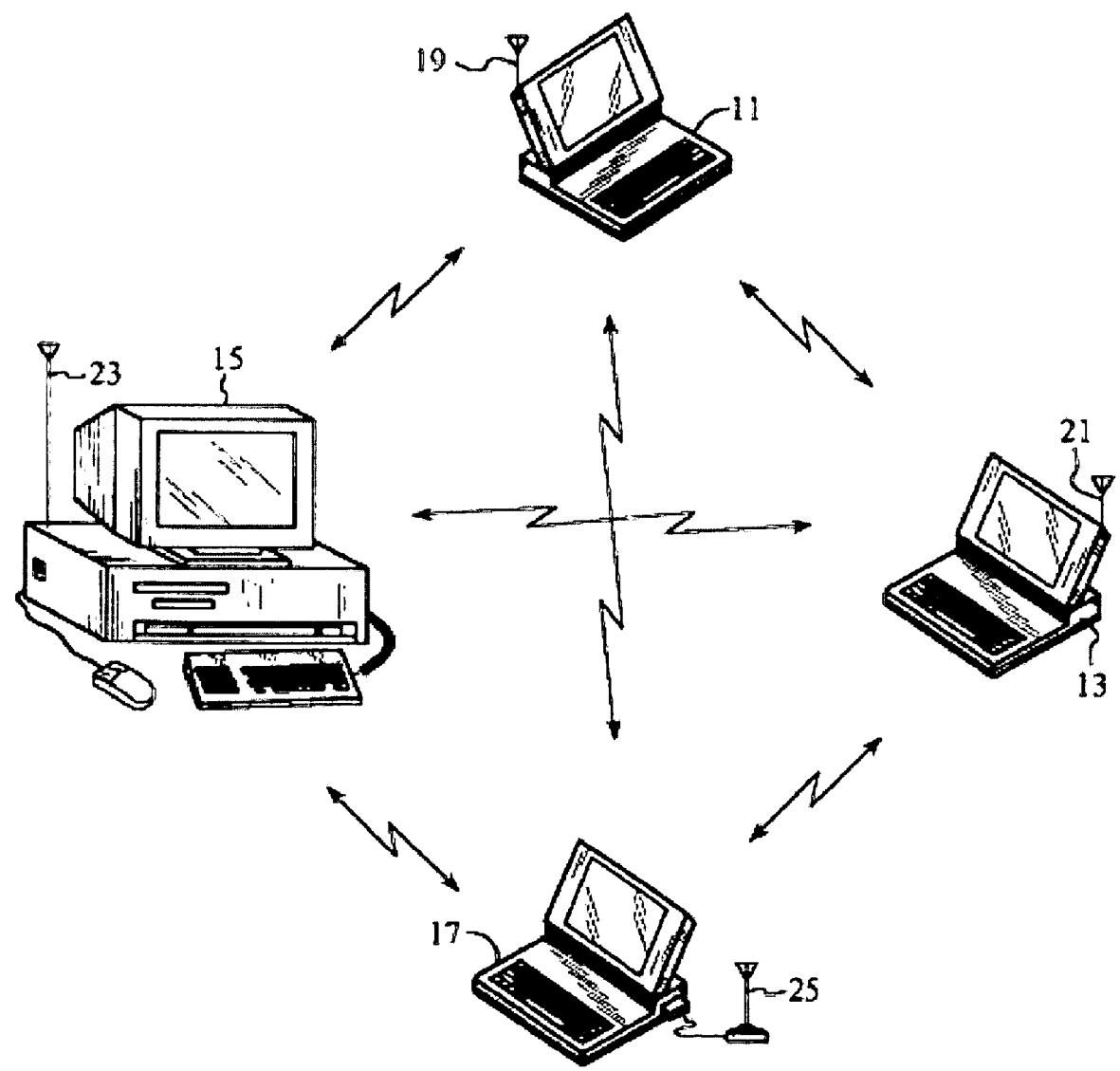
FIG. 1 is a prior art depiction of an ad hoc network using wireless communication.
Figure 2:
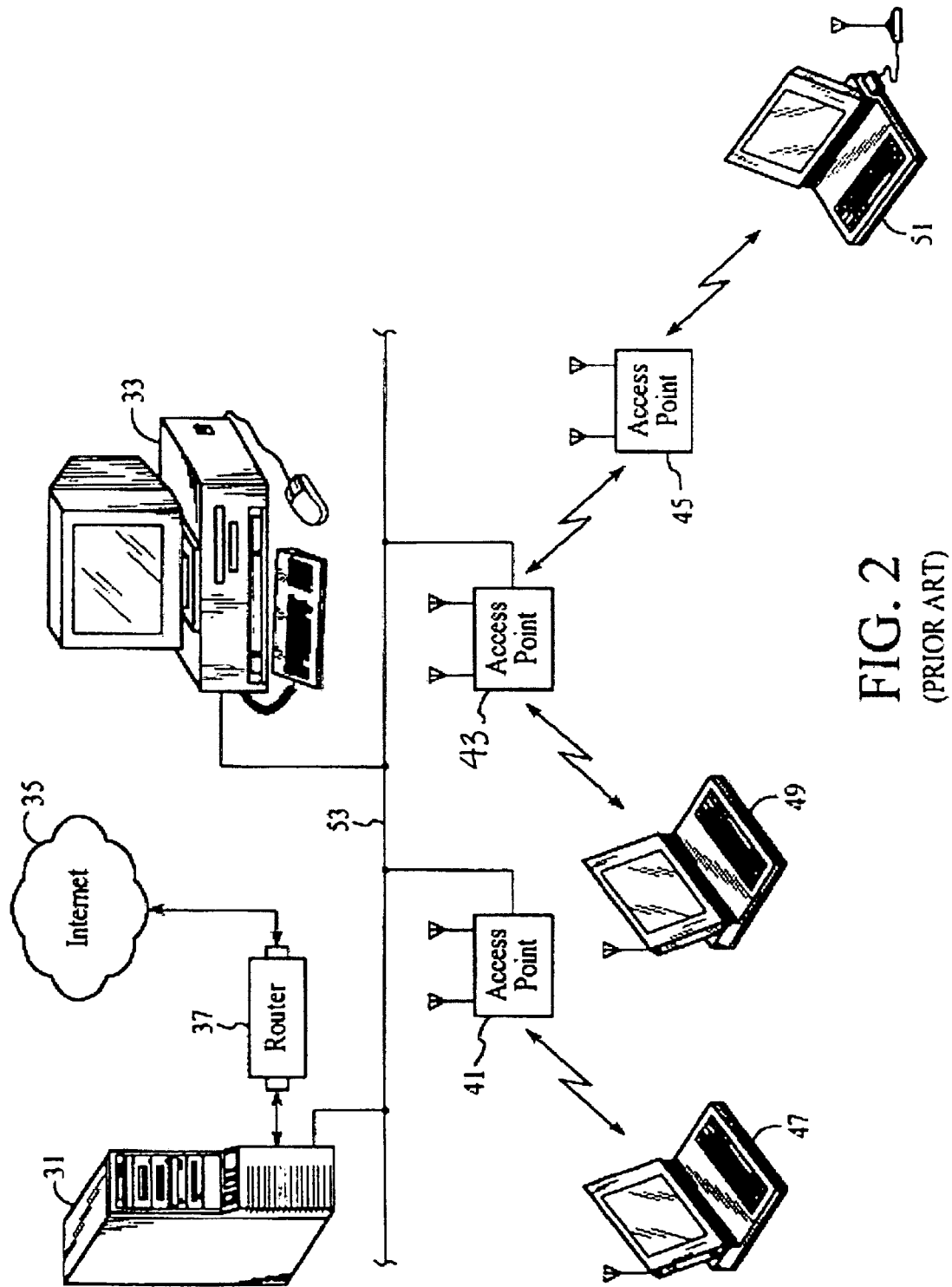
FIG. 2 is a first prior art network layout using both wireline and wireless network connections.
Figure 3:
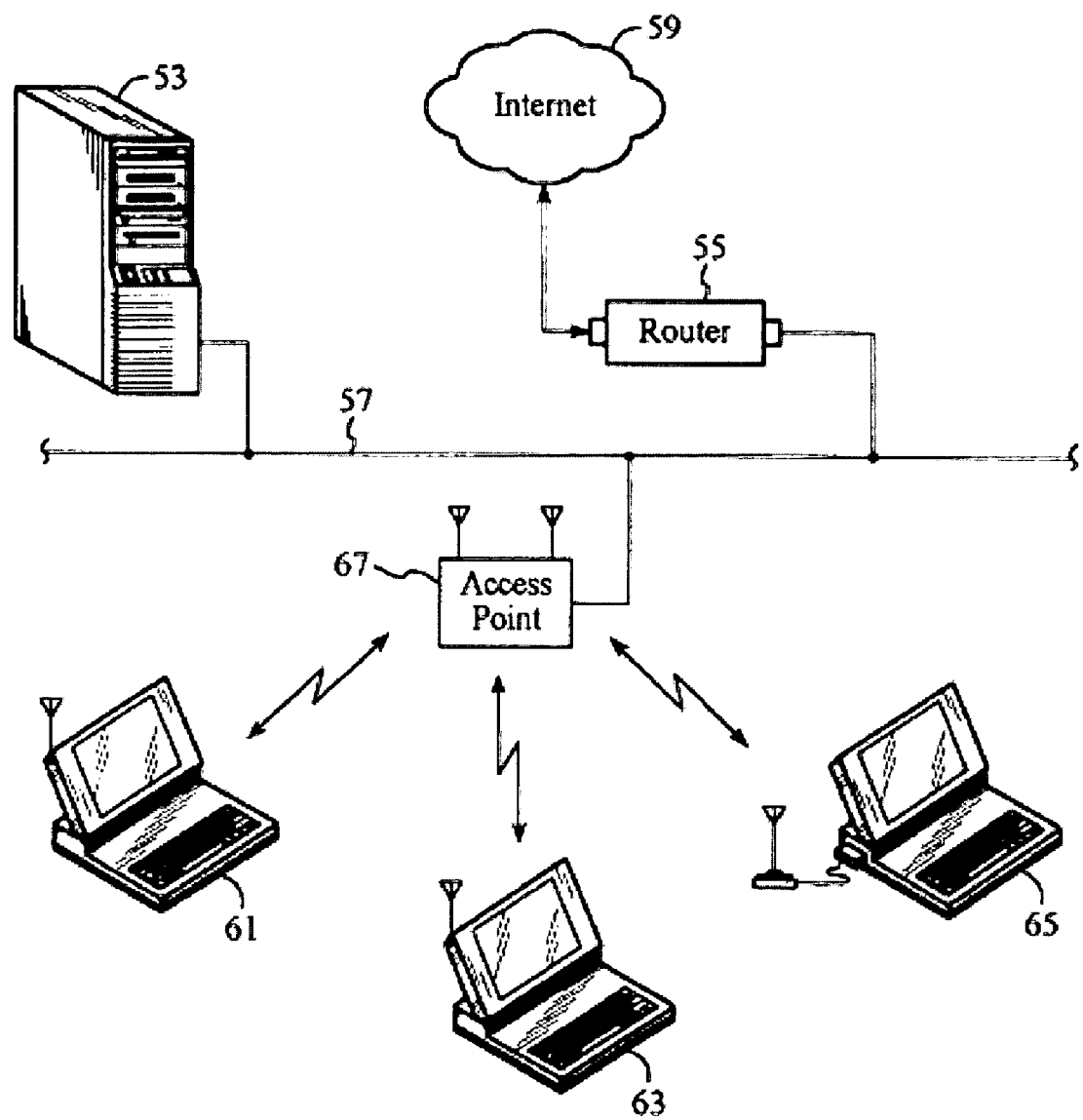
FIG. 3 is a second prior art network layout using both wireline and wireless network connections.
Figure 6:
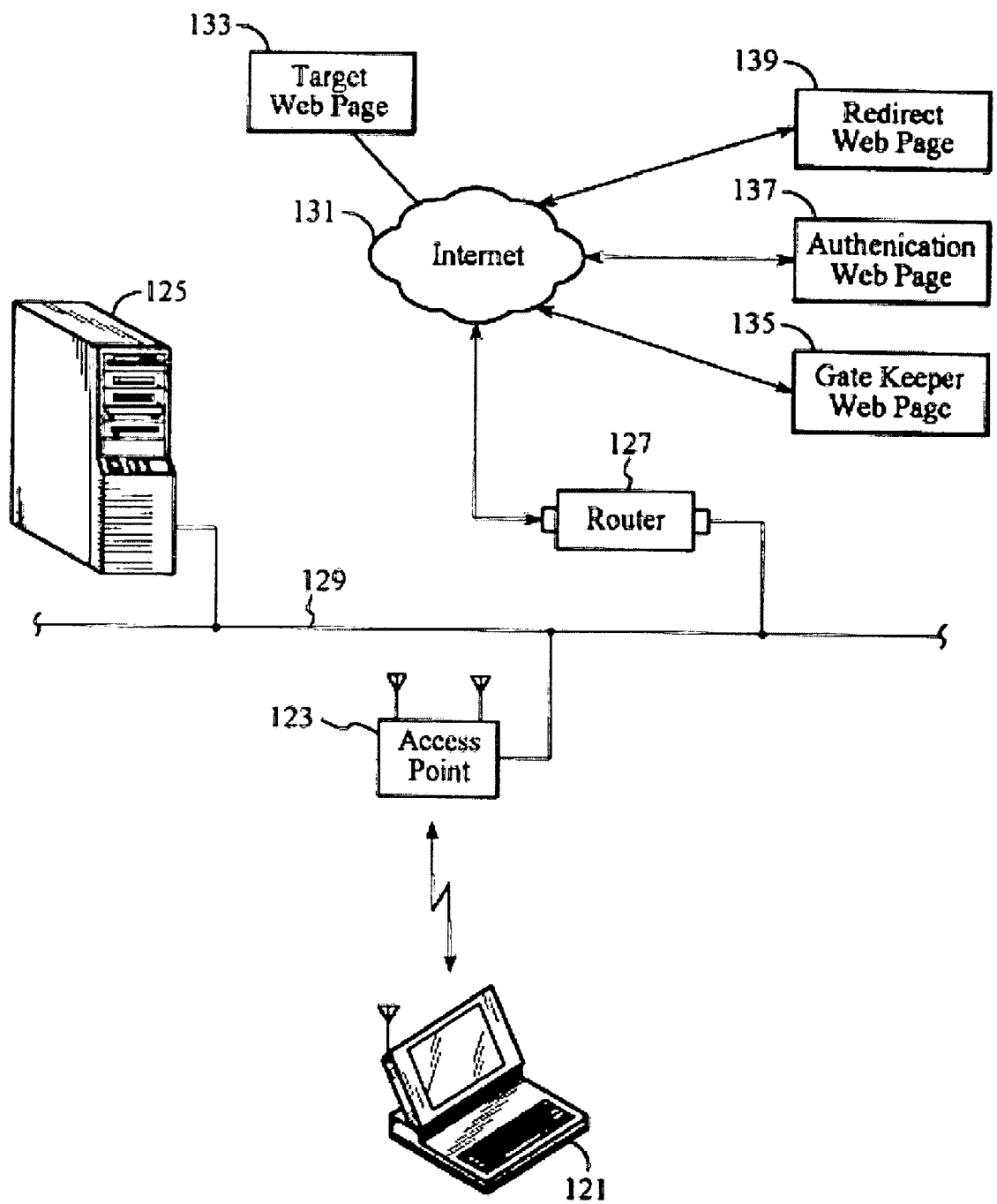
FIG. 6 is a first network layout in accord with the present invention.

A first embodiment of a network system in accord with the present invention is shown in FIG. 6. The present invention may be utilized in a network having a layout similar to that of FIG. 2 or any other known network configuration, but is preferred that an access point 123 in accord with the present invention be placed close to a network node with Internet access. In FIG. 6, router 127 couples a source network 129 with the Internet 131. Therefore, access point 123 is shown next to router 127. In the present example, a mobile user utilizing a laptop computer 121 connects to network 129 using wireless access point 123. It is to be understood that a mobile user may also connect to network 129 by means of a hardware access jack.

Within network 129, server 125 is preferably in charge of authenticating all new users and allocating various network services, including Internet access. In the present example, the mobile user accesses network 129 using a laptop computer 121 and access point 123, but does not have a network account with server 125 and would therefore typically be denied network access. Nonetheless, the mobile user initiates an Internet access session to a desired target web page 133 by means of almost any web browser, such as Microsoft Internet Explorer, Netscape Navigator, etc. The mobile user device 121 thus goes through its domain name resolution process to identify the address of target web page 133. Network 129 will permit all DNS traffic to the Internet, even from unauthorized user, and the mobile user thus receives the correct IP address of its target web page 133.

Figure 8:
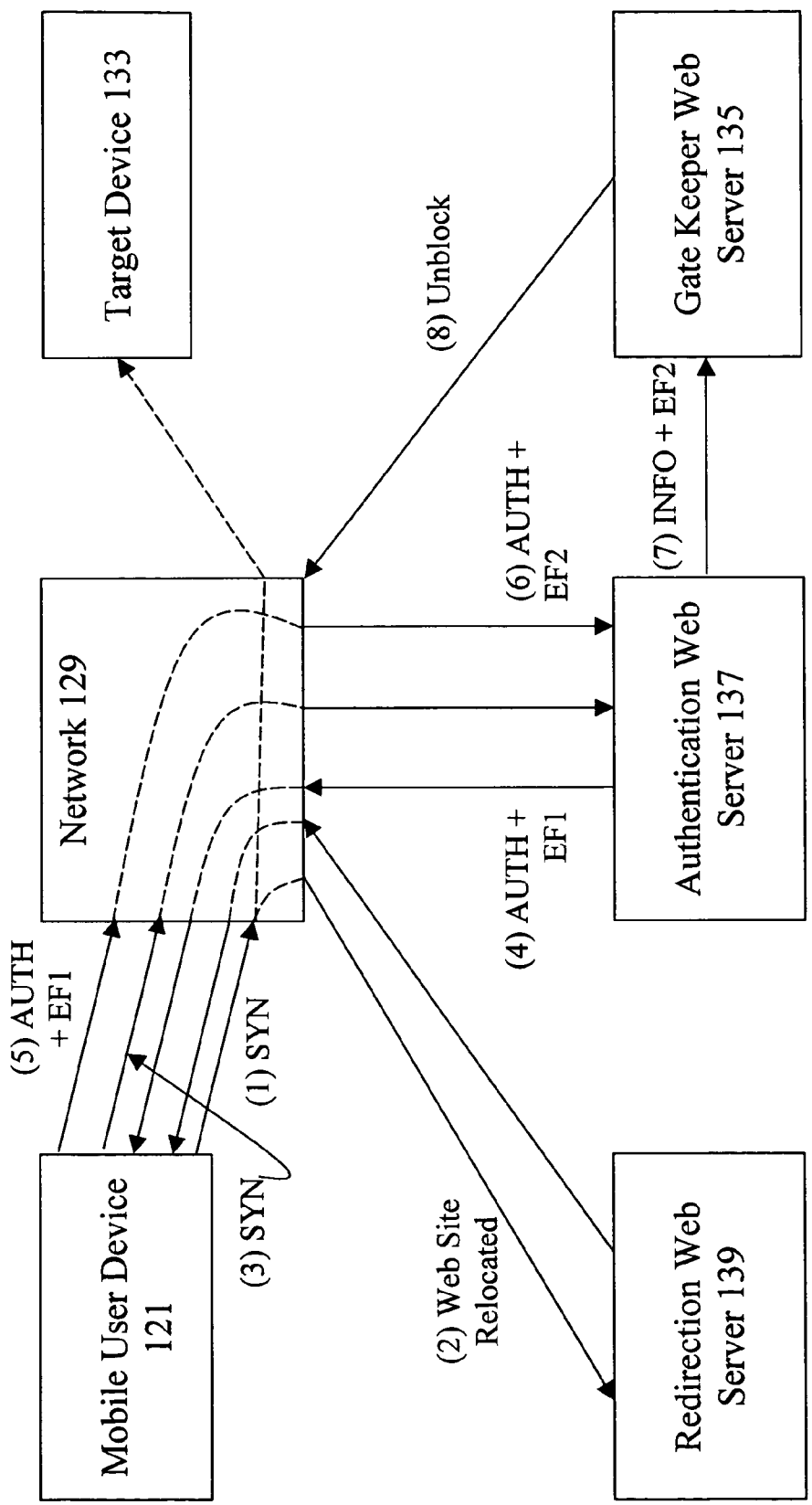
FIG. 8 is a block diagram of message flow in the first network layout.

As is known in the art, a TCP connection is started by a source host sending a SYN, i.e., synchronize/start, packet to a destination host and then waiting for a synchronize acknowledge (SYN ACK). In the present case as shown in FIG. 8, however, when mobile user device 121 attempts to open an HTTP connection to the target device 133 by sending a TCP SYN packet to the target web page 133 using the acquired destination IP address in Step 1, network 129 intercepts the packet and checks if the mobile user device 121 is authorized to gain access to the Internet. If it is, then the message is forwarded accordingly. If the mobile user device is not authorized, then the packet is re-routed to a predetermined redirection web server 139. Redirection web server 139 responds in Step 2 by transmitting a "Web Site Relocated" message that points the mobile user device 121 to an authentication web server 137 (this redirection ability is conventional to HTML, a common language for encoding web pages). The mobile user's web browser responds to the "Web Site Relocated" message by automatically re-sending the HTTP request to authentication web server 137 in Step 3. Again, network 129 intercepts the TCP SYN packet, but upon recognizing that the target website is now the authentication web server 137, the packet is forwarded without alteration.

Thus, network 129 does not prohibit Internet access by unauthorized users, it merely restricts it to a limited number of predetermined websites. Internet access requests to a preauthorized website, such as authentication web server 137, are permitted access to the Internet, but all Internet requests to unauthorized websites are automatically re-routed to redirection server website 139.

In Step 4, authentication web server 137 presents the mobile user device 121 with an HTTP form page soliciting authentication information from the mobile user. The user-supplied authentication information may include a user ID and password, which the user enters via his web browser. At this point, it should be noted that although the mobile user ID has been given an IP address by network 129 in order to communicate within the network, the Internet packet transmitted from the mobile user device 121 to authentication web server 137 may not be relied upon to uniquely identify mobile user device 121 because of the possible use of network address translation by network 129. To overcome this limitation, the HTTP form page transmitted to the mobile user device 121 includes an embedded reserved field preceded by a unique client device ID keyword EF1 provided by the authentication web server 137. The reserved field may be located within the out-going data packet a predetermined number of bytes away from the unique client device ID keyword EF1. Alternatively, the reserved field may be immediately preceded by the unique client device ID keyword EF1.

When the mobile user device 121 forwards its authentication data to authentication web server 137 in Step 5, network 129 detects that a message packet is being sent to authentication web server 137 and responds by inspecting the message packet to detect the embedded reserved field. Since the message has come directly from mobile client device 121, its unique hardware address in the header of its message packet is still valid. Network 129 responds by generating a new client device ID keyword EF2 based on the unique hardware address of mobile client device 121, the current session information, and the address information of network 129. This address information will be dependent on the device on which the present system is implemented. This new client device ID keyword is inserted into the embedded reserved field and the modified message is forwarded to the authentication web server 137 in Step 6.

Upon receiving the HTTP form page from user mobile device 121, authentication web server 137 parses the information in the HTTP form page. Preferably, the information is parsed using a backend CGI script. The authentication web server 137 forwards the user-supplied information and the new client device ID keyword from the embedded reserved field to a gate keeper server 135 in Step 7. The gate keeper server may be accessed via the Internet, or may be directly connected to the authentication web server 137. Preferably, the information is transmitted from the authentication web server 137 to the gate keeper server 135 along a secured link.

It should be noted that server 125, redirection web server 139, authentication web server 137 and gate keeper server 135 need not reside on separate machines, and one or more of these may be co-resident on a machine. Further, these need not be servers in the usual sense of the word and may instead be web pages, scripts, applets or other routines capable of performing the attributed functions. Additionally, the functionality of redirection web server 139 need not be separate and may be integrated into the network 129.

The gate keeper server 135 processes the received authentication data information and checks if the user is registered. If the mobile client has a legitimate account, then the gate keeper server 135 decodes the new client device ID keyword that is in the embedded reserved field to determine the hardware address of the mobile user device 121. The gate keeper server 135 then sends an encrypted "unblock" message in Step 8 based on the same client device ID keyword to network 129. As explained above, the controlling device within network 129 on which the present system is running had inserted the address information of mobile user device 121 in the HTTP form page, therefore gate keeper 135 sends the "unblock" message directly to this controlling device. Preferably, the "unblock" message is encrypted with the new client device ID keyword. Alternatively, a third client device ID keyword may be generated and used for the encryption process. It may include the hardware address of the mobile client device 121, as well as the Internet protocol address of the network 129.

Network 129 verifies the encrypted "unblock" message, and then updates its internal access list to grant Internet services to the mobile client device 121. All subsequent traffic from the mobile client device 121 to the Internet are forwarded by network 129 unimpeded until either an allowed access time expires as described in greater detail below, an explicit "Disable client device" message is received, or the client device 121 disconnects from network 129.

In the description of FIG. 6, the present invention is described as a program routine running in network 129, but the location of the program routine was not explicitly stated. The present invention may be a program routine running in server 125, router 127 or access point 123, or parsed to have its routines distributed among all three.

Thus, all mobile users on network 129 are uniquely identified and verified. It is then possible for network 129 to charge a mobile user for access time on network 129. Alternatively, since the mobile user is authenticated by the gate keeper server 135, it may be advantageous that the gate keeper server 135, or another specialized server record the amount of time that mobile user device 121 spends accessing the Internet 131 through network 129, and charge accordingly. In still an alternate embodiment, a mobile user will have already paid in advance for a predetermined amount of network access time as noted above. When a mobile user is admitted access to a private network, such as network 129, the amount of time paid in advance is transmitted to network 129, which then disconnects mobile user 123 once the time has expired. Any remaining time not used by mobile user device 123 may be forward to the gate keeper server 135, or the corresponding specialized server, and the remaining time on the user's account may be updated accordingly.

Figure 7:
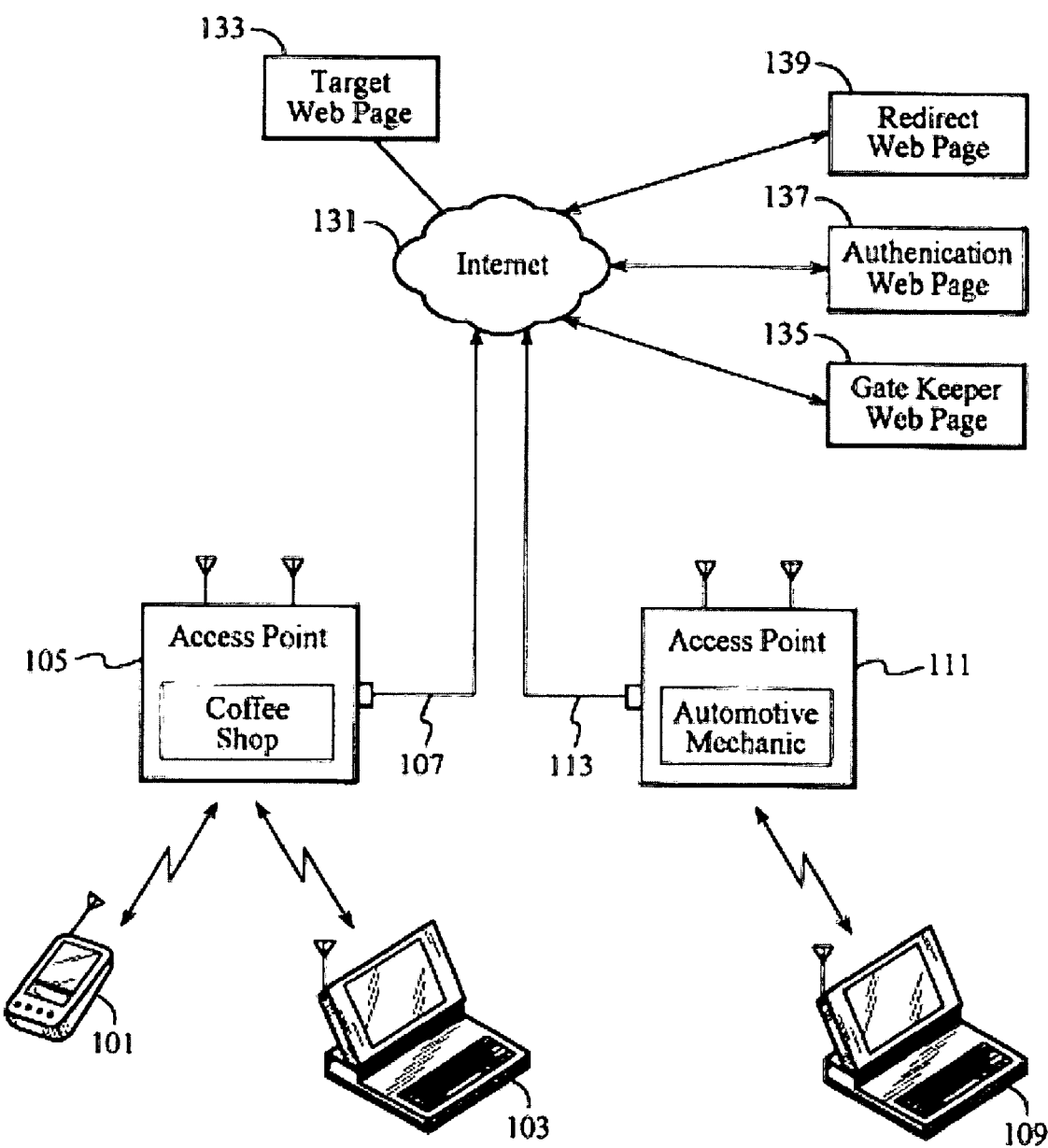
FIG. 7 is a second network layout in accord with the present invention.

An alternate embodiment of the present invention is shown in FIG. 7. Elements in FIG. 7 similar to those of FIG. 6 have similar reference characters and are described above. In the present alternate embodiment, access points 105 and 111 have routing capabilities for connecting to the Internet 131. Thus neither of access points 105 or 111 require a separate hardwired network, such as network 129 shown in FIG. 6, to implement the present invention.

For illustrative purposes, wireless access point 105 is shown located in a coffee shop and wireless access point 111 is shown located in the waiting room of an automotive mechanic's shop. Mobile users may then access the Internet 131 via wireless access point 105 and any known device for establishing a node connection to a network, such as a handheld computing device 101 or laptop computer 103. In the present example, access point 105 is shown as a wireless access device, but it may also provide hardwired connections to client devices. Similarly, a mobile user may use laptop computer 109 to access the Internet 131 via wireless access point 111. In this embodiment, it may be preferable for gate keeper server 135 to maintain a record of Internet access time by devices 101, 103 and 109, and then to send a summary report to the owners of wireless access points 105 and 111.

The present invention has been described above in connection with a preferred embodiment thereof; however, this has been done for purposes of illustration only, and the invention is not so limited. Indeed, variations of the invention will be readily apparent to those skilled in the art and also fall within the scope of the invention.

What is claimed is:

1. A system for controlling Internet access on a network, said system comprising:
    at least one access device for connecting to said network and for originating out-going data packets, each of said at least one access device being characterized by a unique hardware address;
    a redirection server accessible via the Internet;
    a network monitoring device for monitoring out-going data packets sent from said network to the Internet and for verifying if an originator access device of an out-going data packet is authorized for Internet access, all out-going packets originated from authorized access devices being forwarded unimpeded to the Internet and all out-going data packets originated from unauthorized access devices being inspected for determination of their target destination Internet websites, and for checking if a determined target destination Internet website matches a predetermined authentication server website and in response to said checking forwarding a corresponding out-going data packet to said predetermined authentication server, said network monitoring device responding to a match not being found by disregarding the determined destination Internet website and forwarding the out-going data packet to said redirection server;
    whereby all out-going data packets to the Internet gain access to the Internet irrespective of whether their respective originator access devices are authorized for Internet access.

2. The system of claim 1 wherein said redirection server responds to a received data packet from an unauthorized originator access device by sending said originator access device a message instructing it to connect to said predetermined authentication server.

3. The system of claim 1 wherein said authentication server responds to an unsolicited received data packet by sending an originator access device of said data packet a questionnaire form soliciting authentication information, said questionnaire form including a hidden reserved field comprising embedded IDs generated from a hardware host address of a client device and a hardware host address access point and a first identification keyword.

4. The system of claim 3 wherein said hidden reserved field is not accessible by said originator access device which receives said questionnaire form.

5. The system of claim 3 wherein said first identification keyword is based on address information from said network monitoring device.

6. The system of claim 3 wherein said network monitoring device, after verifying that said determined target destination Internet website matches said predetermined authentication server and before forwarding the out-going data to said predetermined authentication server, further scans contents of said out-going data packet in search of said first identification keyword and upon locating said first identification keyword, generates a second identification keyword based on the unique hardware address of the originator access device, said second identification keyword being inserted in said hidden reserved field.

7. The system of claim 6 wherein said second identification keyword is additionally based on current communication session information.

8. The system of claim 6 wherein said second identification keyword is additionally based on location information of said network monitoring device.

9. The system of claim 6 wherein said hidden reserved field is located within said out-going data packet a predetermined number of bytes away from said first identification keyword.

10. The system of claim 6 wherein said hidden reserved field is immediately preceded by said first identification keyword within said out-going data packet.

11. The system of claim 3 wherein said originator access device receiving said questionnaire form uses web browsing software to supply said solicited authentication information into said questionnaire form before transmitting the questionnaire form back to said authentication server via the Internet.

12. The system of claim 1 wherein said authentication server responds to a solicited data packet having a hidden reserved field by:
    extracting the contents of said hidden reserved field comprising embedded IDs generated from a hardware host address of a client device and a hardware host address access point; and
    extracting authentication information from said solicited data packet, the extracted information being sent to a gate keeper server.

13. The system of claim 12 wherein said gate keeper server is accessible via the Internet.

14. The system of claim 12 wherein said authentication server uses a CGI script to parse said extracted information from said solicited data packet.

15. The system of claim 12 wherein said gate keeper server compares said authentication information with a predefined database to determine if said originator access device is registered, and responds to the verification of the originator access device being registered by sending an unblock message from said authentication server to said network monitoring device.

16. The system of claim 15 wherein said unblock message is encrypted with an identification keyword.

17. The system of claim 15 wherein upon verification of the originator access device being registered, said gate keeper server decodes contents of said hidden reserved field to determine the unique hardware address of said originator access device and labeling said unblock message with said hardware address.

18. The system of claim 15 wherein said network monitoring device responds to receipt of said unblock message by updating a network access list to authorize said originator access device for Internet access.

19. A system for remotely authenticating a user on a private network via the Internet, the system comprising:
   a network access device for permitting said user access to said private network, said access device being characterized by a unique hardware;
   an authentication server accessible via the Internet;
   a network monitoring device for monitoring the destination address of all out-going messages from said private network to the Internet and for scanning the content of any message whose destination is said authentication server to search for a first predetermined identification code in said message, said network monitoring device responding to the detection of said first predetermined identification code by determining the hardware address of the access device that originated the message and generating a second identification code based on said hardware address, said network monitoring device further inserting said second identification code in said message before forwarding said message to said authentication server;
   said authentication server responding to receipt of said forwarded message from said network monitoring device by decoding said hardware address from said second identification code; a third identification code based on said hardware address being generated and transmitted along with an unblock message from said authentication server to said network monitoring device.

20. The system of claim 19 wherein said network monitoring device responds to said unblock message by updating a network access list to authorize for Internet access the user whose network access device has the same hardware address as is embedded in said third identification code.

21. The system of claim 19 wherein said second identification code is further based on the Internet protocol address of said network monitoring device.

22. The system of claim 19 wherein said third identification code is further based on the Internet protocol address of said network monitoring device.

23. The system of claim 19 wherein said network monitoring device responds to the absence of said first predetermined identification code in a message whose destination is said authentication server by forwarding said message to said authentication server with no modification to said message.

24. The system of claim 19 wherein said network monitoring device is further effective for verifying if an out-going message is originated by an authorized user and permitting all out-going messages from authorized users unimpeded access to the Internet, all messages from unauthorized users having their destination addresses inspected to determined if their destination is said authentication server, and responding to a destination address other than said authentication server by ignoring the destination address and forwarding the message to a predetermined redirection server via the Internet;
   whereby all out-going messages to the Internet are granted access to the Internet irrespective of whether the message is originated by an unauthorized user.

25. The system of claim 24 wherein said redirection server responds to a received message from an unauthorized user by sending the user's network access device a message instructing it to connect to said authentication server.

26. The system of claim 19 wherein said authentication server responds to a received message lacking said second identification code by generating said first predetermined identification code based on location information of said private network, said authentication server further sending the network access device that originated the message a questionnaire form soliciting authentication information from its respective user, said questionnaire form including a hidden reserved field comprising embedded IDs generated from a hardware host address of a client device and a hardware host address access point and said first predetermined identification code.

27. The system of claim 26 wherein said hidden reserved field is not accessible by the user that receives said questionnaire form.

28. The system of claim 26 wherein said hidden reserved field is preceded by said first predetermined identification code in said questionnaire form.

29. The system of claim 26 wherein said network monitoring device inserts said second identification code in said hidden reserved field of any messages sent by a user to said authorization server.

30. The system of claim 26 further having a gate keeper server, said authentication server further being able to identified filled questionnaire forms received from unauthorized users and being effective for parsing out the user's authentication information along with said hardware address from said second identification code;
   said authentication information and hardware address being relayed to said gate keeper server for verification, said gate keeper server responding to the verification of an unauthorized user by generating said third identification code and transmitting said unblock message to said network monitoring device.

31. The system of claim 30 wherein said gate keeper is accessed via a secure link from said authorization server.

32. The system of claim 30 wherein said authorization server accesses said gate keeper server via the Internet.

* * * * *